(12) United States Patent
Coull et al.

(10) Patent No.: US 7,101,146 B2
(45) Date of Patent: Sep. 5, 2006

(54) SPLIT VANE FLOW BLOCKER

(75) Inventors: Jennifer A. Coull, Lake Worth, FL (US); John P. Nikkanen, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 60 days.

(21) Appl. No.: 10/737,599

(22) Filed: Dec. 16, 2003

(65) Prior Publication Data

US 2005/0129501 A1 Jun. 16, 2005

(51) Int. Cl.
*F01D 17/00* (2006.01)

(52) U.S. Cl. .................... 415/127; 415/159; 415/209.1

(58) Field of Classification Search ............. 415/127, 415/144, 145, 148, 151, 159, 166, 167, 209.1
See application file for complete search history.

(56) References Cited

U.S. PATENT DOCUMENTS

| 867,611 A | * | 10/1907 | Schulz ..................... 415/149.2 |
| 4,534,166 A | | 8/1985 | Kelm et al. |
| 5,372,485 A | * | 12/1994 | Sumser et al. .............. 415/166 |
| 5,996,333 A | | 12/1999 | Forestier et al. |
| 6,226,977 B1 | | 5/2001 | Ichiryu et al. |

* cited by examiner

*Primary Examiner*—Richard A. Edgar
(74) *Attorney, Agent, or Firm*—Bachman & LaPointe

(57) ABSTRACT

A gas path flow blocker comprising a plurality of vanes each comprising a forward portion and an aft portion defining a plurality of gas paths, a forward ring comprising a central axis about which is circumferentially disposed the plurality of forward portions, and an aft ring disposed about the central axis about which is circumferentially disposed the plurality of aft portions wherein the forward ring and the aft ring are moveable with respect to each other to at least partially block the flow of a gas through the gas paths.

11 Claims, 2 Drawing Sheets

SPLIT VANE FLOW BLOCKER

U.S. GOVERNMENT RIGHTS

The invention was made with U.S. Government support under contract N00019-02-C-3003 awarded by the U.S. Navy. The U.S. Government has certain rights in the invention.

BACKGROUND OF THE INVENTION (1) Field of the Invention

The present invention relates to an apparatus for controlling the flowpath area in a gas turbine engine. More specifically, the present invention relates to an apparatus for adjustably controlling the flowpath area of a gas turbine engine through the use of rotationally mounted vane components.

(2) Description of the Related Art

When operating gas turbine engines, it is frequently desirable to control the amount of gas flowing through the secondary flowpath between the outer duct and the inner support structure. One common method of achieving such control is to install an apparatus for adjusting the area through which the gas may flow. It is most desirable for such an apparatus to provide for complete blockage of gas flow when necessary while causing little if any blockage when needed. Typically, an attempt to maximize the efficiency of either of these constraints results in a diminution in the efficiency of the other.

What is therefore needed is an apparatus, and method for so using, for controlling the flowpath area in a gas turbine engine which provides both near total blockage of gas flow and virtual unimpeded flow of gas when desired.

SUMMARY OF THE INVENTION

Accordingly, it is an object of the present invention to provide an apparatus for controlling the flowpath area in a gas turbine engine. More specifically, the present invention relates to an apparatus for adjustably controlling the flowpath area of a gas turbine engine through the use of rotationally mounted vane components.

In accordance with the present invention, a gas path flow blocker comprises a plurality of vanes each comprising a forward portion and an aft portion defining a plurality of gas paths, a forward ring comprising a central axis about which is circumferentially disposed the plurality of forward portions, and an aft ring disposed about the central axis about which is circumferentially disposed the plurality of aft portions, wherein the forward ring and the aft ring are moveable with respect to each other to at least partially block the flow of a gas through the gas paths.

In further accordance with the present invention, a method of controlling gas flow through a gas flowpath comprises the steps of providing a plurality of vanes each comprising a forward portion and an aft portion defining a plurality of gas paths, providing a forward ring comprising a central axis about which is circumferentially disposed the plurality of forward portions, providing an aft ring disposed about the central axis about which is circumferentially disposed the plurality of aft portions, rotating at least one of the rings about the central axis to at least partially block the flow of a gas through the gas paths.

In further accordance with the present invention, A gas path flow blocker comprises a plurality of vanes each comprising a forward portion and an aft portion defining a plurality of gas paths, a forward ring comprising a central axis about which is circumferentially disposed the plurality of forward portions, an aft ring disposed about the central axis about which is circumferentially disposed the plurality of aft portions, and a moveable plate disposed about the central axis and between the forward ring and the aft ring about which is circumferentially disposed a plurality of holes wherein the moveable plate is rotationally moveable with respect to the forward ring and the aft ring to at least partially block the flow of a gas through the gas paths.

DETAILED DESCRIPTION

It is a central teaching of the present invention to provide a split vane flow blocker for blocking the flow of gas through the secondary flowpath in a gas turbine engine. Specifically, there is provided between the outer duct and the inner support structure of a turbine engine a stationary aft ring and a rotatable forward ring to which is circumferentially attached a multitude of vanes. Each vane consists of a forward portion and an aft portion, attached to the aforementioned forward ring and aft ring respectively. When the forward ring is positioned such that each forward portion of each vane is aligned with its corresponding aft portion, each vane forms a singular airfoil. In such a configuration, gas is able to flow through the secondary flowpath and past the vanes with a minimum of pressure loss. Each vane is separated into a forward portion and an aft portion along a boundary normal to the centerline of the turbine engine. The width of this boundary is equal to the separation distance between adjacent vanes. As a result, when the forward ring is rotated a linear distance at its perimeter approximately equal to the width of the boundary so formed, there is accomplished nearly complete blockage of airflow. Furthermore, by rotating the forward ring a linear distance at its perimeter which is less than the aforementioned boundary distance, fractional blockage may be accomplished to any desirable degree. In an alternative embodiment, a rotatably moveable plate is inserted between the aft and forward rings wherein the moveable plate has a series of holes located about its periphery. The holes have a width approximately equal to the aforementioned boundary width and are separated by the same approximate width. As a result, rotation of the moveable plate allows for near total blockage of airflow, little or no blockage, or any desired fractional blockage.

Figure 1:
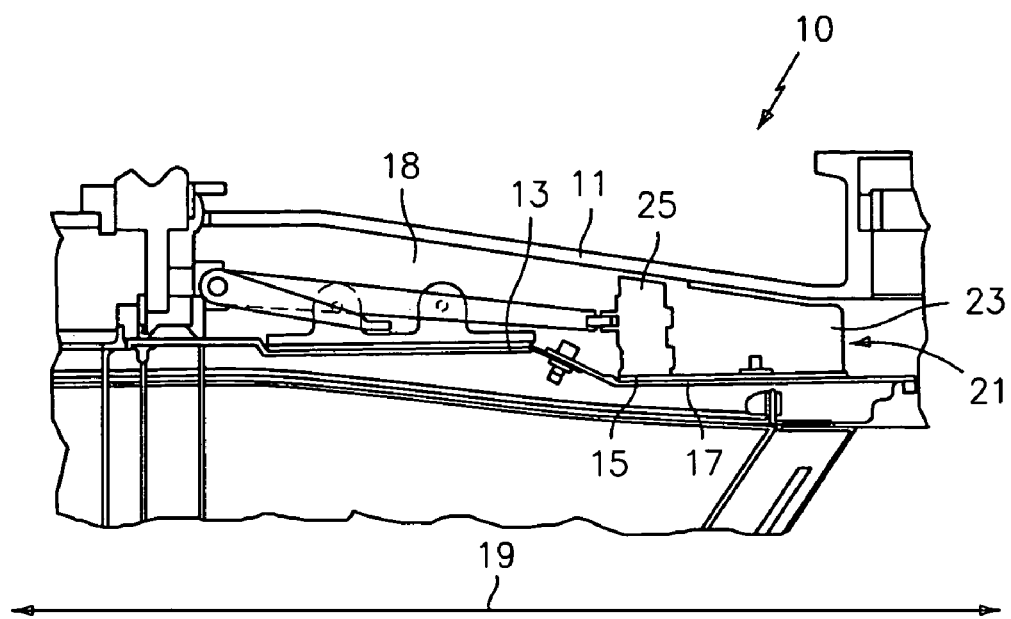
FIG. 1 A cross section of a portion of a gas turbine engine illustrating the split vane flow blocker of the present invention.

With reference to FIG. 1, there is illustrated in detail the orientation of the split vane flow blocker 10 of the present invention. Split vane flow blocker consists of numerous vanes 21 each formed of a forward portion 25 and an aft portion 23. The forward portions 25 and the aft portions 23 are circumferentially disposed about forward ring 15 and aft ring 17 respectively. Both forward ring 15 and aft ring 17 are of essentially identical diameters and are disposed about a central axis 19 of a turbine engine. As such, each vane 21 comprised of a forward portion 25 and an aft portion 23 is located in the secondary flowpath between the outer duct 11 and the inner support structure 13 of the gas turbine engine. Aft ring 17 is preferably stationary while forward ring 15 is capable of rotational movement about central axis 19. Such a configuration allows forward ring 15 to be positioned such that each attached forward portion 25 is in alignment with a corresponding aft portion 23 attached to aft ring 17. Forward ring 15 may be rotated as needed such that each aft forward portion 25 is out of alignment with its corresponding aft portion 23 attached to ring 17 as will be described more fully below.

Figure 2:
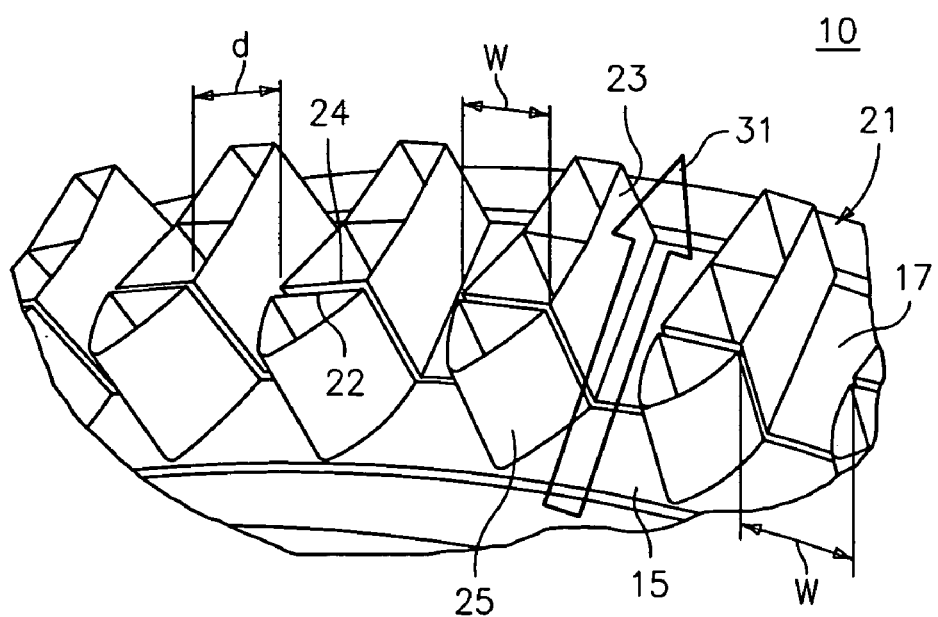
FIG. 2 A perspective view of the vanes of the split vane flow blocker of the present invention in a fully open position.

With reference to FIG. 2, there is illustrated in perspective a more detailed view of each vane 21 comprised of an aft portion 23 and a forward portion 25. As illustrated, when each forward portion 25 is aligned with a corresponding aft portion 23, a trailing edge 22 of the forward portion 25 rests in close proximity to the leading edge 24 of a corresponding aft portion 23. In a preferred embodiment, vane 21 has an airfoil shape. Leading edge 24 is of a width w and is oriented normal to central axis 19. Trailing edge 22 is of an approximately identical width w and is likewise oriented normal to central axis 19. The configuration illustrated in FIG. 2 corresponds to the split vane flow blocker 10 of the present invention being fully open. In such a configuration, the split vane flow blocker 10 has an airfoil profile as described above that provides a small pressure drop when a gas, in particular air, passes through the split vane flow blocker 10. Each vane 21 is separated from each adjacent vane by a distance d. The separation distance d is approximately equivalent or equivalent to width w.

Figure 3:
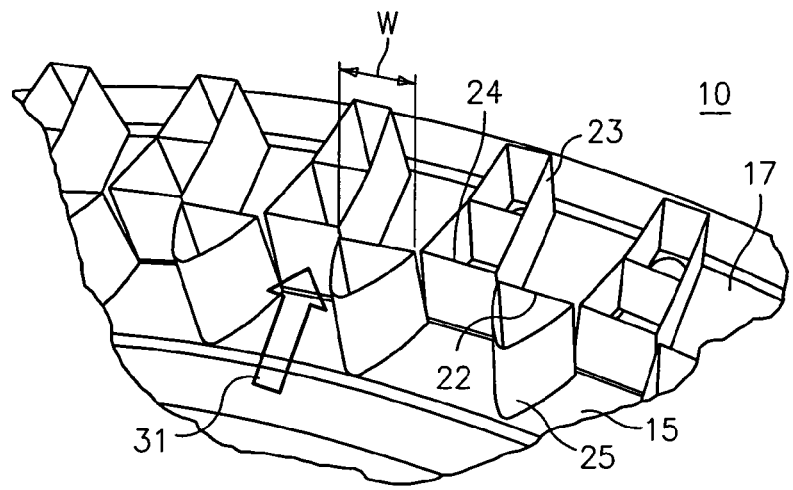
FIG. 3 A perspective view of the vanes of the split vane flow blocker of the present invention in a fully closed position.

With reference to FIG. 3, there is illustrated in perspective the split vane flow blocker 10 of the present invention in a fully closed position. Note that forward ring 15 has been rotated a distance along its path equal to width w. As was noted above, width w is approximately equivalent or equivalent to the separation distance d between adjacent aft portions 23 and forward portions 25. As a result of this rotation, leading edge 24 of each aft portion 23 is in a position blocking airflow between adjacent forward portions 25. In this configuration, there is therefore little or no opening through which air may pass. As a result, this configuration is referred to as a fully closed position.

While the present invention has been described in the context of the front ring 15 being rotatable, the split flow blocker 10 will operate in the same fashion if the alt ring 17 is rotatable and the forward ring 15 is stationary or if both rings 15 and 17 are rotatable.

There is therefore illustrated with respect to FIGS. 2 and 3, both a fully open and fully closed position of the split vane flow blocker 10 of the present invention respectively. It is therefore obvious that a rotation of the forward ring 15 a distance not precisely equal to width will result in a configuration whereby the split vane flow blocker 10 is in a "partially closed" position. In a partially closed position, split vane flow blocker 10 offers an impediment to the flow of gas through the vanes 21 of the split vane flow blocker 10 resulting in a pressure drop greater than that experienced in a fully open configuration.

Figure 4A:
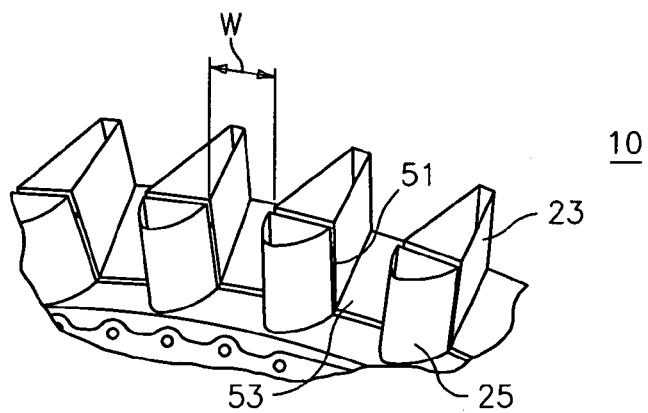
FIG. 4a–b Perspective views of the vanes and moveable plate of the split vane flow blocker of the present invention.
Figure 4B:
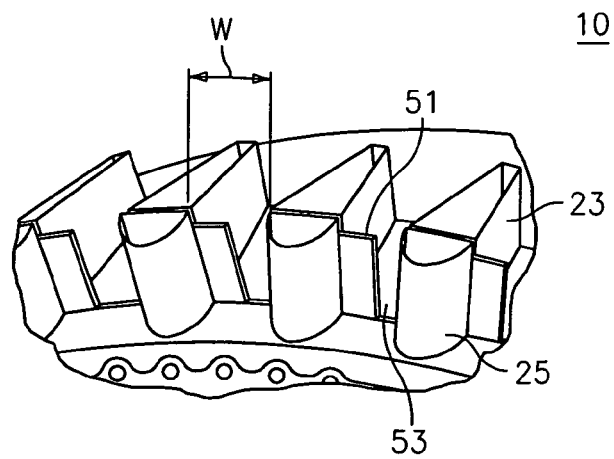

With reference to FIGS. 4a–b, there is illustrated an alternative embodiment of the present invention. A rotatably moveable plate 51 is inserted between the aft and forward rings and is similarly rotatable about central axis 19. Moveable plate 51 has a series of holes 53 located about its periphery. The holes 53 have a width w approximately equal to the aforementioned width w and are separated by the same approximate width w. If the forward ring 15 and aft ring 17 are held stationary, moveable plate 51 may be rotated as desired to partially block the flow of air. As a result, rotation of the moveable plate allows for near total blockage of airflow, little or no blockage, or any desired fractional blockage.

It is apparent that there has been provided in accordance with the present invention an apparatus for controlling the flowpath area in a gas turbine engine which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A gas path flow blocker assembly for use in a gas turbine engine having a gas flowpath between an outer duct and an inner support structure comprising:
   a plurality of vanes located in said gas flowpath between said outer duct and said inner support structure of said gas turbine engine, each of said vanes having an airfoil shape and comprising a forward portion and an aft portion defining a plurality of gas paths;
   said flowpath being a secondary flowpath;
   a forward ring comprising a central axis about which is circumferentially disposed said plurality of forward portions; and
   an aft ring disposed about said central axis about which is circumferentially disposed said plurality of aft portions, wherein said forward ring and said aft ring are moveable with respect to each other to at least partially block the flow of a gas through said gas paths.

2. The flow blocker assembly of claim 1, wherein each of said plurality of forward portions has a trailing edge of a width w and each of said aft portions has a leading edge of said width w.

3. The flow blocker assembly of claim 2, wherein each of said plurality of vanes is separated from each adjoining one of said plurality of vanes by a width d.

4. The flow blocker assembly of claim 3, wherein said width d is approximately equal to said width w.

5. The flow blocker assembly of claim 1, wherein said forward ring is rotatable about said central axis.

6. The flow blocker assembly of claim 2, wherein said forward ring may be positioned such that each of said plurality of trailing edges is aligned with one of said plurality of leading edges.

7. The flow blocker assembly of claim 2, wherein each of said plurality of trailing edges and each of said plurality of leading edges are aligned normal to said central axis.

8. A method of controlling gas flow through a secondary gas flowpath of a gas turbine engine located between an outer duct and an inner support structure of said gas turbine engine comprising the steps of:
   providing a plurality of vanes positioned in said secondary gas flowpath between said outer duct and said inner support structure, each of said vanes having an airfoil shape and comprising a forward portion and an aft portion defining a plurality of gas paths;
   providing a forward ring comprising a central axis about which is circumferentially disposed said plurality of forward portions;
   providing an aft ring disposed about said central axis about which is circumferentially disposed said plurality of aft portions; and rotating at least one of said rings about said central axis to at least partially block the flow of a gas through said gas paths.

9. The method of claim 8 wherein said rotating said at least one ring comprises rotating said forward ring such that each of said plurality of forward portions is aligned with one of said plurality of aft portions to form an airfoil.

10. The method of claim 8 wherein said rotating said at least one ring comprises rotating said forward ring such that each of said plurality of forward portions is not in alignment with any one of said plurality of aft portions.

11. The method of claim 8 wherein said providing said plurality of vanes comprises the steps of:
   providing a plurality of forward portions each having a trailing edge of a width w;
   providing a plurality of aft portions each having a leading edge of said width w;
   separating each of said plurality of vanes from each adjoining one of said plurality of vanes by a width d whereby said width w is approximately equal to said width d.

* * * * *